(12) United States Patent
Ramakrishnan (10) Patent No.: US 9,781,132 B2
(45) Date of Patent: Oct. 3, 2017

(54) FRAUD PREVENTION

(71) Applicant: Yahoo!, Inc., Sunnyvale, CA (US)

(72) Inventor: Binu Ramakrishnan, Milpitas, CA (US)

(73) Assignee: Yahoo Holdings, Inc., Sunnyvale, CA (US)

( * ) Notice: Subject to any disclaimer, the term of this patent is extended or adjusted under 35 U.S.C. 154(b) by 17 days.

(21) Appl. No.: 14/881,316

(22) Filed: Oct. 13, 2015

(65) Prior Publication Data

US 2017/0104764 A1 Apr. 13, 2017

(51) Int. Cl.
*H04L 29/06* (2006.01)
*G06F 17/24* (2006.01)

(52) U.S. Cl.
CPC .......... *H04L 63/123* (2013.01); *G06F 17/243* (2013.01); *H04L 63/083* (2013.01); *H04L 63/0823* (2013.01); *H04L 63/1483* (2013.01); *G06F 2221/2119* (2013.01)

(58) Field of Classification Search
CPC ............. H04L 63/1483; H04L 63/0823; G06F 2221/2119
See application file for complete search history.

(56) References Cited

U.S. PATENT DOCUMENTS

| 7,634,810 B2 * | 12/2009 | Goodman | H04L 63/1416 |
| | | | 726/22 |
| 7,668,921 B2 * | 2/2010 | Proux | H04L 12/585 |
| | | | 709/203 |
| 7,725,585 B2 * | 5/2010 | Parkinson | H04L 63/12 |
| | | | 709/227 |
| 7,757,088 B2 * | 7/2010 | Abdulhayoglu | G06F 17/30861 |
| | | | 705/44 |
| 8,010,996 B2 * | 8/2011 | Cline | G06F 21/31 |
| | | | 715/700 |
| 8,127,360 B1 * | 2/2012 | Wilhelm | G06F 21/552 |
| | | | 726/25 |
| 8,220,035 B1 * | 7/2012 | Pravetz | H04L 63/1483 |
| | | | 715/749 |

(Continued)

OTHER PUBLICATIONS

Dhamija, R. and Tygar, J.D., Jul. 2005. The battle against phishing: Dynamic security skins. In Proceedings of the 2005 symposium on Usable privacy and security (pp. 77-88). ACM.*

(Continued)

*Primary Examiner* — James Turchen
(74) *Attorney, Agent, or Firm* — Cooper Legal Group, LLC (57) ABSTRACT

As provided herein, a user of a client device may navigate to a webpage using a browser. A browser window, populated with a verification image and/or details about the webpage, is generated and presented to the user. The verification image and/or details about the webpage differentiate a browser window generated by the browser, from the webpage, from a browser window generated by a malicious user. The browser window comprises a login box into which credentials for logging into the user account may be entered. Responsive to the user entering correct credentials into the login box and selecting a submit option based upon recognition of the verification image, the browser window may be submitted to a server and the user may be presented with a window comprising access to the user account.

20 Claims, 10 Drawing Sheets

(56) References Cited

U.S. PATENT DOCUMENTS

| | | | | |
|---|---|---|---|---|
| 8,353,016 B1* | 1/2013 | Pravetz | G06F 21/36 | 715/749 |
| 8,694,784 B1* | 4/2014 | Lekies | H04L 9/3226 | 713/169 |
| 8,713,677 B2* | 4/2014 | Soghoian | H04L 51/14 | 709/206 |
| 8,938,780 B2* | 1/2015 | Ekdahl | G06F 21/74 | 726/2 |
| 8,984,604 B2* | 3/2015 | Begley | H04L 63/08 | 726/7 |
| 9,154,472 B2* | 10/2015 | Hart | H04L 63/0442 | |
| 9,398,047 B2* | 7/2016 | Goutal | H04L 63/1483 | |
| 2006/0020812 A1* | 1/2006 | Steinberg | G06F 21/31 | 713/181 |
| 2006/0070126 A1* | 3/2006 | Grynberg | G06F 21/6263 | 726/22 |
| 2006/0174119 A1* | 8/2006 | Xu | H04L 63/08 | 713/170 |
| 2007/0006305 A1* | 1/2007 | Florencio | H04L 63/14 | 726/22 |
| 2007/0039042 A1* | 2/2007 | Apelbaum | G06F 21/46 | 726/6 |
| 2007/0136806 A1* | 6/2007 | Berman | G06Q 10/107 | 726/22 |
| 2007/0199054 A1* | 8/2007 | Florencio | H04L 63/1416 | 726/5 |
| 2007/0255953 A1* | 11/2007 | Peyret | H04L 9/32 | 713/168 |
| 2007/0282832 A1* | 12/2007 | Herley | G06F 21/6263 | |
| 2008/0034428 A1* | 2/2008 | Bejar | G06F 21/31 | 726/23 |
| 2008/0046738 A1* | 2/2008 | Galloway | H04L 63/1416 | 713/176 |
| 2008/0046968 A1* | 2/2008 | Cline | G06F 21/31 | 726/2 |
| 2008/0232392 A1* | 9/2008 | Liang | H04L 65/105 | 370/450 |
| 2009/0089869 A1* | 4/2009 | Varghese | G06F 21/31 | 726/7 |
| 2010/0049975 A1* | 2/2010 | Parno | H04L 63/08 | 713/168 |
| 2011/0126289 A1* | 5/2011 | Yue | G06F 21/554 | 726/26 |
| 2011/0277024 A1* | 11/2011 | Begley | H04L 63/08 | 726/7 |
| 2013/0124285 A1* | 5/2013 | Pravetz | G06Q 10/00 | 705/14.23 |
| 2013/0124309 A1* | 5/2013 | Traasdahl | H04L 67/22 | 705/14.49 |
| 2014/0201835 A1* | 7/2014 | Emigh | G06F 21/55 | 726/23 |
| 2014/0259103 A1* | 9/2014 | Gunasekara | H04W 12/12 | 726/2 |
| 2015/0215359 A1* | 7/2015 | Bao | H04L 65/605 | 709/219 |
| 2016/0241592 A1* | 8/2016 | Kurkure | H04L 63/08 | |

OTHER PUBLICATIONS

Marforio, C., Masti, R.J., Soriente, C. and Kostiainen, K., May 2016. Evaluation of Personalized Security Indicators as an Anti-Phishing Mechanism for Smartphone Applications. In Proceedings of the 2016 CHI Conference on Human Factors in Computing Systems (pp. 540-551). ACM.*

Dhamija, et al., "The Battle Against Phishing: Dynamic Security Skins", Symposium on Usable Privacy and Security (SOUPS) 2005, Jul. 6-8, 2005, Pittsburgh, PA, USA, pp. 1-12, http://web.archive.org/web/20080406062150/http://people.seas.harvard.edu/~rachna/papers/securityskins.pdf.

* cited by examiner

FRAUD PREVENTION

BACKGROUND

Many service providers may be susceptible to phishing, where a malicious user, software, and/or website may attempt to steal or trick users into providing account information. For example, malicious site may generate a spoof webpage that mimics a sign-in page of a webmail provider. A user, having an account with the webmail provider, may enter their account username and/or password into the spoof page. In an example, the malicious site and/or a host managing the malicious site may access the user's webmail account and send multiple spam emails to the user's contacts and/or steal user information. Unfortunately, the user may be unable to differentiate between the spoof page and the sign-in page, and thus may provide their account information to the malicious site.

SUMMARY

In accordance with the present disclosure, one or more client devices, systems, and/or methods for accessing a user account provided by a server are provided. In an example, responsive to a client device (e.g., comprising a processor, a display, and/or a memory storing instructions that, when executed on the processor, provide a system) of a user navigating to a webpage, a certificate (e.g., a secure socket layer (SSL), a transport layer security (TLS), an extended validation certificate, etc.), associated with the webpage, may be verified as authentic or not authentic. The system may comprise an operating system, a browser, an application that communicates with one or more webpages, etc.

Responsive to the certificate being verified as authentic, a verification image, stored by the client device having an association with the server providing the webpage, may be identified and a form window (e.g., a sandboxed form window, a browser window) may be generated. In an example, the certificate may comprise a server verification image (e.g., such as a logo associated with the webpage, an image embedded in the certificate, a fingerprint of the image embedded in the certificate, etc.). The form window may comprise the verification image (e.g., selected by the user, provided to the user by the client device, etc.), a login box (e.g., comprising a username field, and/or a password field), an input box (e.g., comprising a credit card number field, a social security number field, etc.), the server verification image, a name of an organization providing the webpage, a country in which the organization resides, a province in which the organization resides, an address at which the organization resides, a domain name associated with the webpage, and/or other information.

Responsive to credentials being entered into the login box (e.g., a username being entered into the username field and/or a password being entered into the password field) and/or the user selecting a submit option based upon recognition of the verification image and/or the server verification image, the form window may be submitted to the server at a server location designated by the certificate. In an example, responsive to a correct input (e.g., a correct credit card number) being input into the input box, the user may be presented with a window comprising a receipt of the input. In an example, the user may enter the username into the username field and/or the password into the password field. In an example, the username field and/or the password field may be hidden from the user, and the username and/or the password may be entered from a cache of the client device.

Responsive to the server granting access based upon the credentials corresponding to the user account (e.g., the credentials comprising correct credentials for the user account), the user may be presented with a window (e.g., a user interface) comprising access to the user account.

In an example, the client device (e.g., a Smartphone of the user) may be configured to communicate with a second client device (e.g., a tablet of the user), to provide instructions to the second client device. Responsive to the second client device, associated with the user, navigating to the webpage and verifying that the certificate, associated with the webpage, is authentic, the client device may instruct the second client device to generate a second form window (e.g., a second special sandboxed form window, a second browser window, etc.) comprising the verification image. The client device may instruct the second client device to present the second form window to the user through the second client device.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
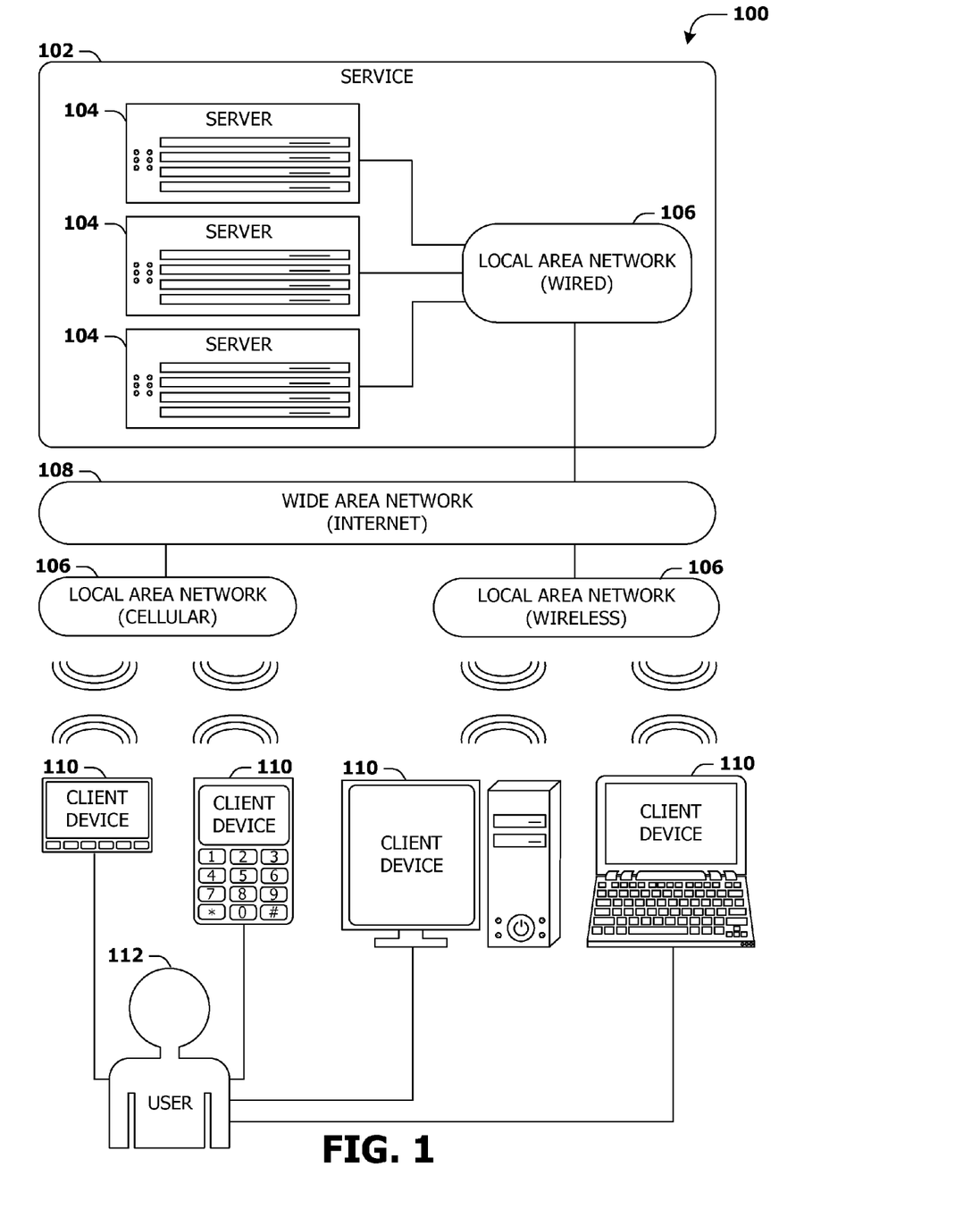
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
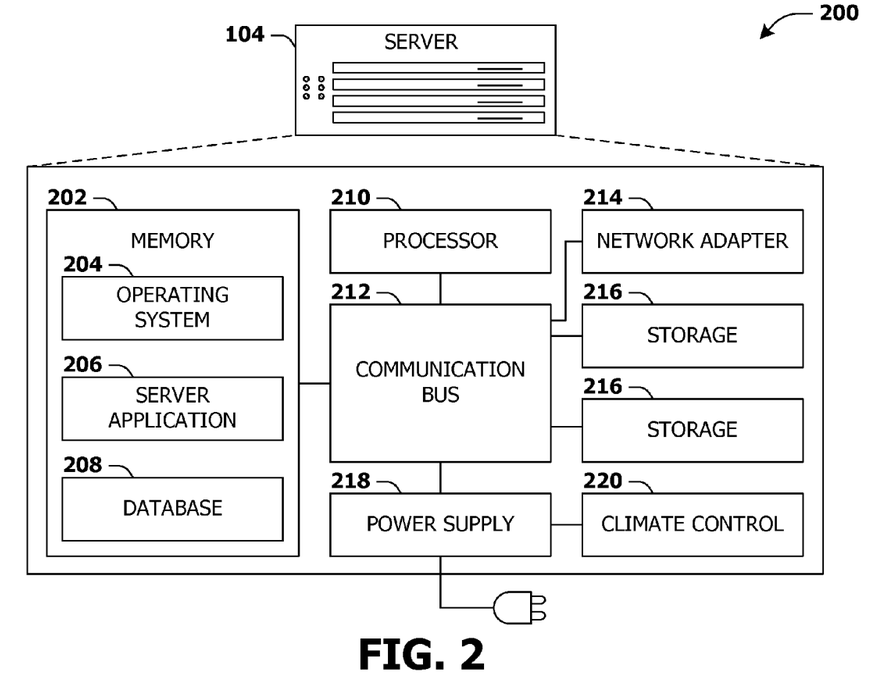
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
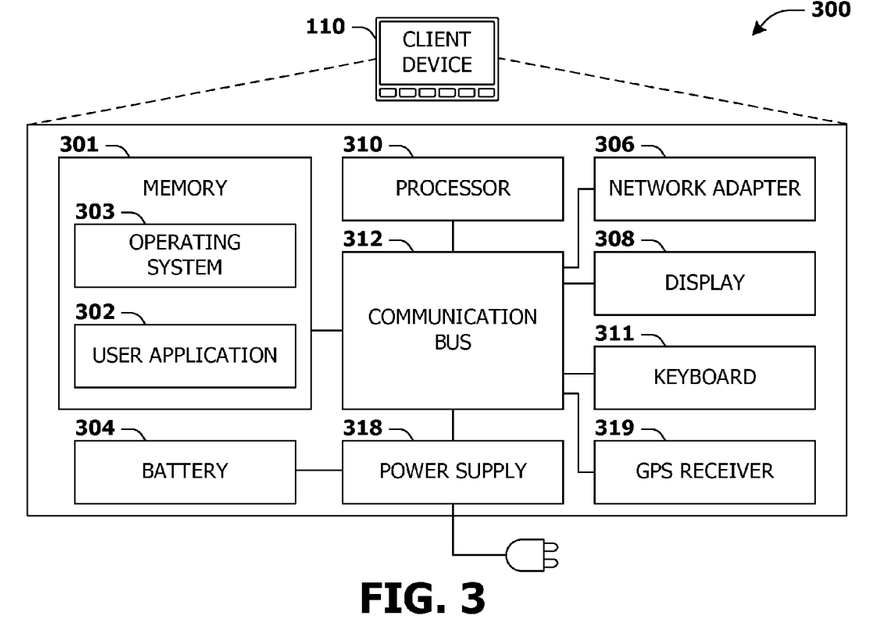
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more client devices, systems, and/or techniques for accessing a user account provided by a server are provided. A client device, comprising a browser, may navigate to a webpage. In an example, the webpage may comprise a login for a service provider (e.g., a webmail account). In an example, the browser may validate a certificate (e.g., a secure socket layer, a transport layer security, an extended validation certificate, etc.) associated with the webpage during a "handshake" between the browser and the server. Responsive to a request (e.g., a hyper text transfer protocol (HTTP) request) sent by the browser, the server may provide an HTTP header associated with the webpage to the browser. Responsive to the webpage being validated by the browser, the browser may generate a form window (e.g., a sandboxed form window) populated with a validation image (e.g., an image, selected by the user or selected by the server, to indicate the webpage is valid), a username field, and/or a password field. In an example, responsive to the webpage not being validated by the browser (e.g., the webpage may be deemed to be an invalid webpage comprising a malicious webpage, a spoof of a real webpage, etc. based upon the browser not validating the certificate), the browser may generate a second form window lacking the validation image. The user, based upon recognizing the validation image, may enter a username into the username field and/or a password into the password field, and select a submit option. In an example, the user may identify a spoofed page based upon a lack of the validation image on a form window. In another example, the user, based upon recognizing the lack of the validation image, may navigate away from the webpage without disclosing their username and/or password to the invalid webpage, thus preventing a malicious entity, hosting the invalid webpage, from obtaining account information of the user for malicious purposes.

Users may establish trusted relationships through the browser, the client device, etc. Such trusted relationships may utilize validation images to increase user awareness of invalid webpages that would otherwise appear to be valid webpages (e.g., a user may identify a malicious webpage, used to spoof a real bank webpage, based upon the client device not displaying the validation image to the user). Thus, user account security may be increased because the trusted relationships are used to decrease a likelihood that user accounts (e.g., a banking website account) will be hacked and/or abused. The ability to validate the webpage and convey the validation to the user utilizing the validation image may increase user account security, user satisfaction, and/or user confidence.

Figure 4A:
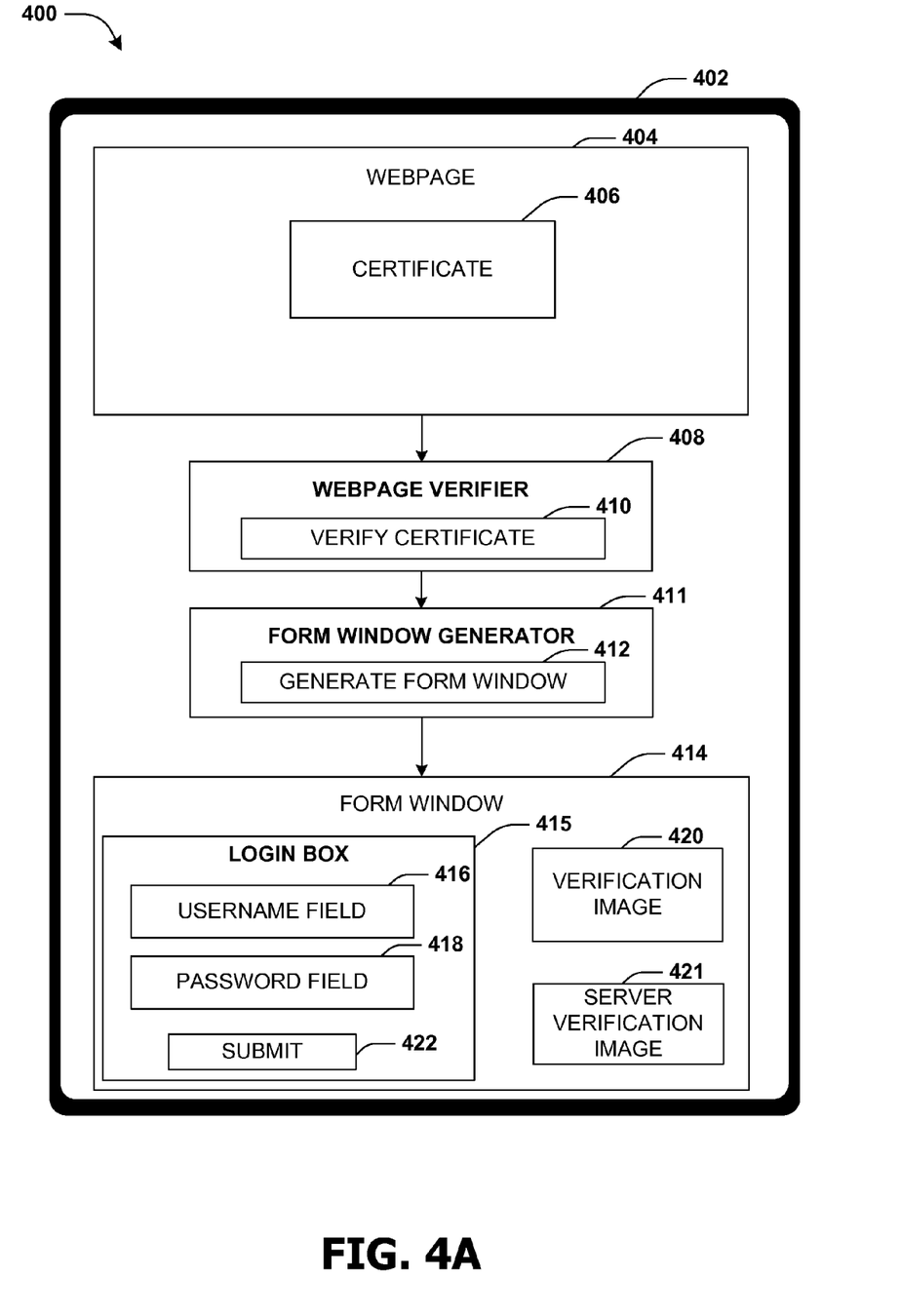
FIG. 4A is a component block diagram illustrating an example system for accessing a user account provided by a server, where a form window comprising a verification image is generated.

FIGS. 4A-4C illustrate an example system 400 for accessing a user account, provided by a server 430, utilizing a client device 402. A user, of the client device 402 (e.g., comprising a processor, a display, and/or a memory storing instructions that, when executed on the processor provide a system) may navigate to a webpage 404 (e.g., a social network login page of a social network). In an example, the system may comprise a browser, an operating system, a mobile application (e.g., an internet navigation application such as WebView), an application interacting with one or more webpages, etc. In an example, the client device 402 may visit the server 430 (e.g., a trusted server associated with the social network) over hyper text transport protocol secure (HTTPS).

A certificate 406 (e.g., a secure socket layer, a transport layer security, an extended validation certificate, etc.) may be associated with the webpage 404. A webpage verifier 408 may verify 410 that the certificate 406 is authentic (e.g., verify that the webpage 404 is associated with the social network server and not a malicious server). Responsive to the user navigating to the webpage 404, the server 430 may set a HTTP header response (e.g., a return no content response). Responsive to the webpage verifier 408 verifying 410 the certificate 406, a form window generator 411 may generate 412 a form window 414 (e.g., a sandboxed form window). In an example, the sandboxed form window may disable a browser extension, a browser plug-in, an incognito capability, and/or may be isolated from one or more webpages. In an example, the certificate 406 may comprise a server verification image 421 (e.g., such as a logo associated with the webpage, an image embedded in the certificate, a fingerprint of the image embedded in the certificate, etc.). In an example, the HTTP header may instruct the form window generator 411 to generate 412 the form window 414. For example, the form window generator 411 may be triggered to generate the form window 414, on the client device 402, based upon receiving the return no content response. The form window 414 may be populated with a verification image 420 (e.g., an image, selected by the user and/or the server 430, to be displayed to indicate that the webpage is verified), the server verification image 421 (e.g., an embedded logo image in the certificate 406 that authenticates the server) and/or a login box 415. In an example, the server verification image 421 may be presented in the login box 415. The login box 415 may comprise a username field 416, a password field 418, an option to submit 422 the form window 414, and/or additional fields (e.g., a credit card number field, a social security number field, etc). In an example, the form window 414 may comprise an input box. The input box (e.g., an input form) may comprise the credit card number field, the social security number field, etc. In an example, the form window 414 may be populated with a name of an organization providing the webpage (e.g., the social network), a country in which the organization resides, a province in which the organization resides, an address at which the organization resides, the server verification image, and/or a domain name associated with the webpage (e.g., SocialNetworkDomain.com). In an example, the server verification image 421 may be presented outside the form window 414 (e.g., in a browser toolbar of a browser, a URL bar of the browser, etc.).

Figure 4B:
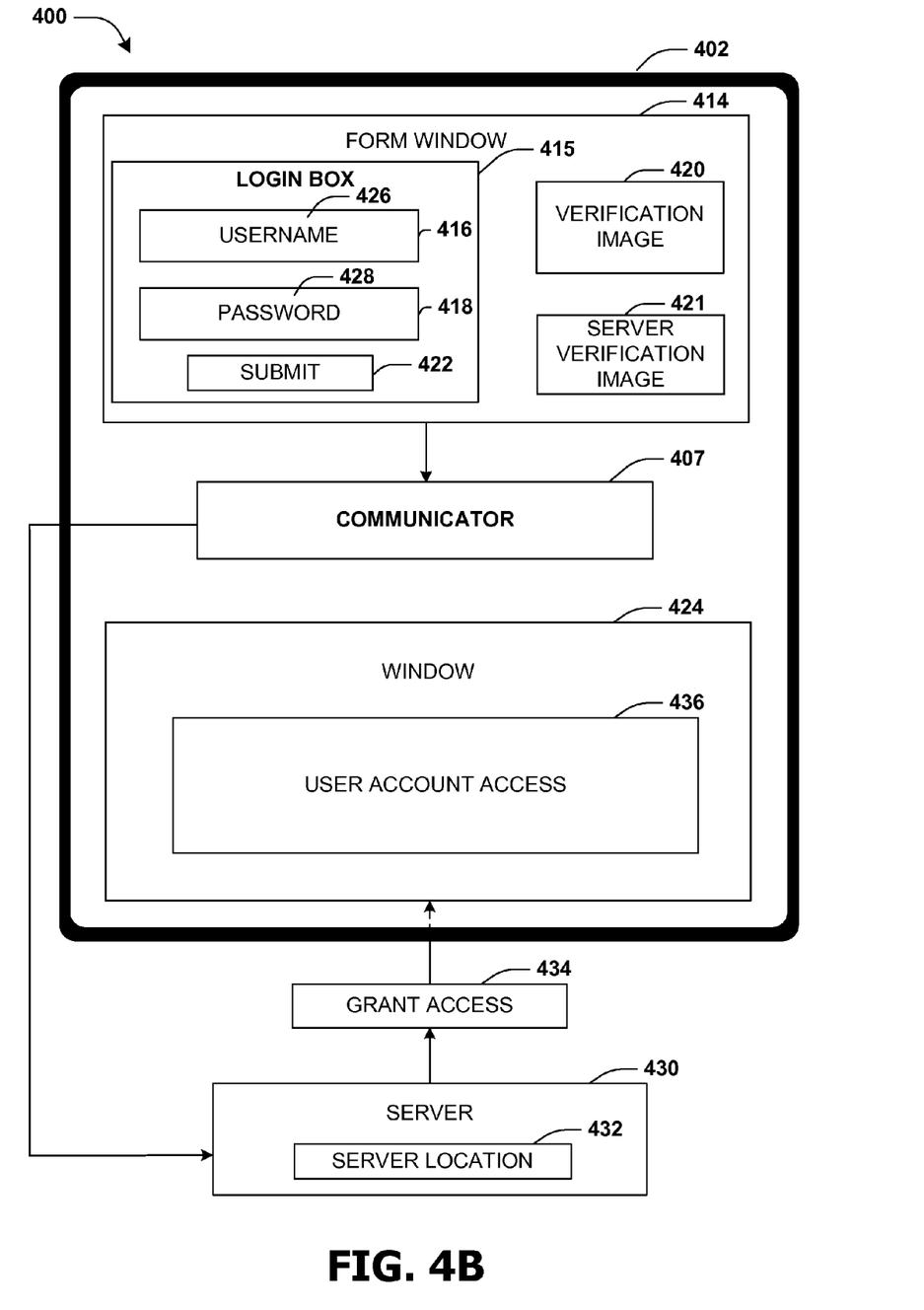
FIG. 4B is a component block diagram illustrating an example system for accessing a user account provided by a server, where access to the user account is granted.

FIG. 4B illustrates the example system 400 granting access 434 to the user account of the user through the client device 402. Credentials may be entered into the login box 415 (e.g., a login form), for example, a username 426 may be entered into the username field 416 and/or a password 428 may be entered into the password field 418. In an example, the user may enter the username 426 and/or the password 428. In another example, input (e.g., a credit card number, a social security number, and/or other sensitive information) may be entered into the input box. The user may select submit 422, and a communicator 407 may submit the form window 414 to the server 430 at a server location 432 designated by the certificate 406. In an example, the communicator 407 may submit the form window 414 to a second server identified in a "formsubmit" parameter (e.g., such as specified in the HTTP header response).

In another example, the username field 416 and/or the password field 418 may be hidden from the user. In an example, the username 426 and/or the password 428, having been cached by a cache component, may be entered into the username field 426 and/or the password field 428 (e.g., such as when the username field 416 and/or the password field 418 are hidden). If the username 426 and/or password 428 are cached, then the user may merely select submit 422, based upon the user recognizing the verification image 420. Responsive to the server 430 granting access based upon the username 426 and/or password 428 corresponding to the user account (e.g., the credentials comprise correct credentials), the communicator 407 may present the user with a window 424 (e.g., an HTML page) comprising access 436 to the user account. In another example, the server 430 may preload a second window form to the client device 402. The user may directly open a second window (e.g., using a shortcut icon), comprised in the second window form, and provide user credentials. In another example, responsive to the input comprising a correct input (e.g., a correct credit card number, a correct social security number, etc.) the user may be presented with the window 424 comprising conformation of receipt of the input.

Figure 5:
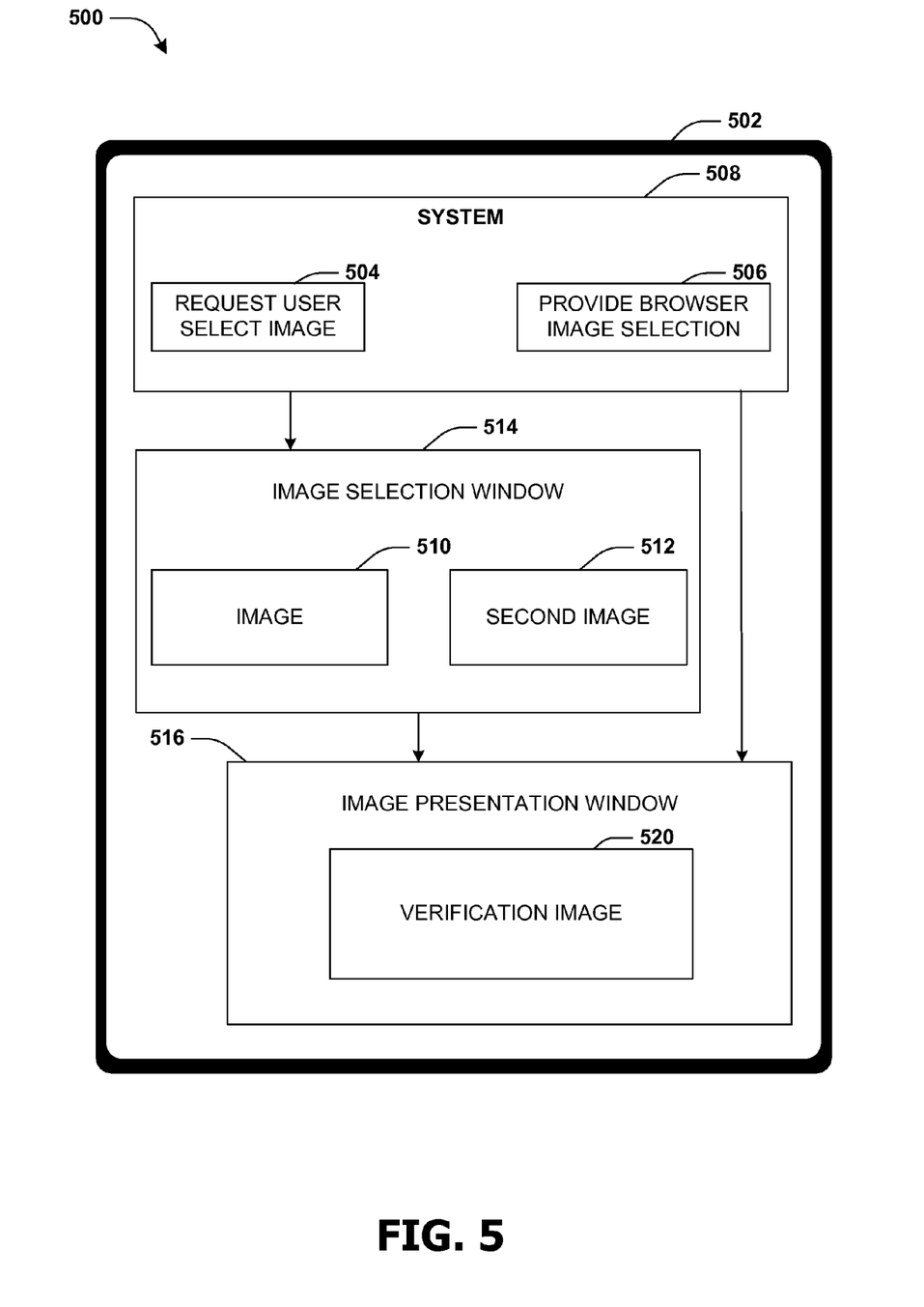
FIG. 5 is a component block diagram illustrating an example system for accessing a user account provided by a server, where a verification image is selected.

FIG. 5 illustrates an example system 500 for accessing a user account, provided by a server, utilizing a system 508. A user, of a client device 502, may navigate to a webpage for an initial visit or a visit after a threshold period has elapsed since a last visit (e.g., 30 days or some other period). A certificate may be associated with the webpage. In an example, responsive to a webpage verifier verifying that the certificate is authentic, the system 508 may present the user with a request 504 to select an image as a verification image 520 for the webpage. For example, the system 508 may present the user with an image selection window 514 comprising an image 510, a second image 512, and/or other images not illustrated. In an example, the user may be provided with an option to upload an uploaded image, from the client device 502, to use as the verification image 520. Responsive to the user selecting the image 510, the system 508 may present the image 510 in an image presentation window 516 as the verification image 520. In another example, the verification image may be selected by the client device 502.

In an example, the system 508 may present the user with the image selection window 514 (e.g., where the user selects the verification image 520), prior to the user navigating to the webpage. The verification image 520 may comprise a global verification image (e.g., the global verification image may be displayed for one or more webpages for various content servers, responsive to such webpages being verified as authentic).

Figure 6:
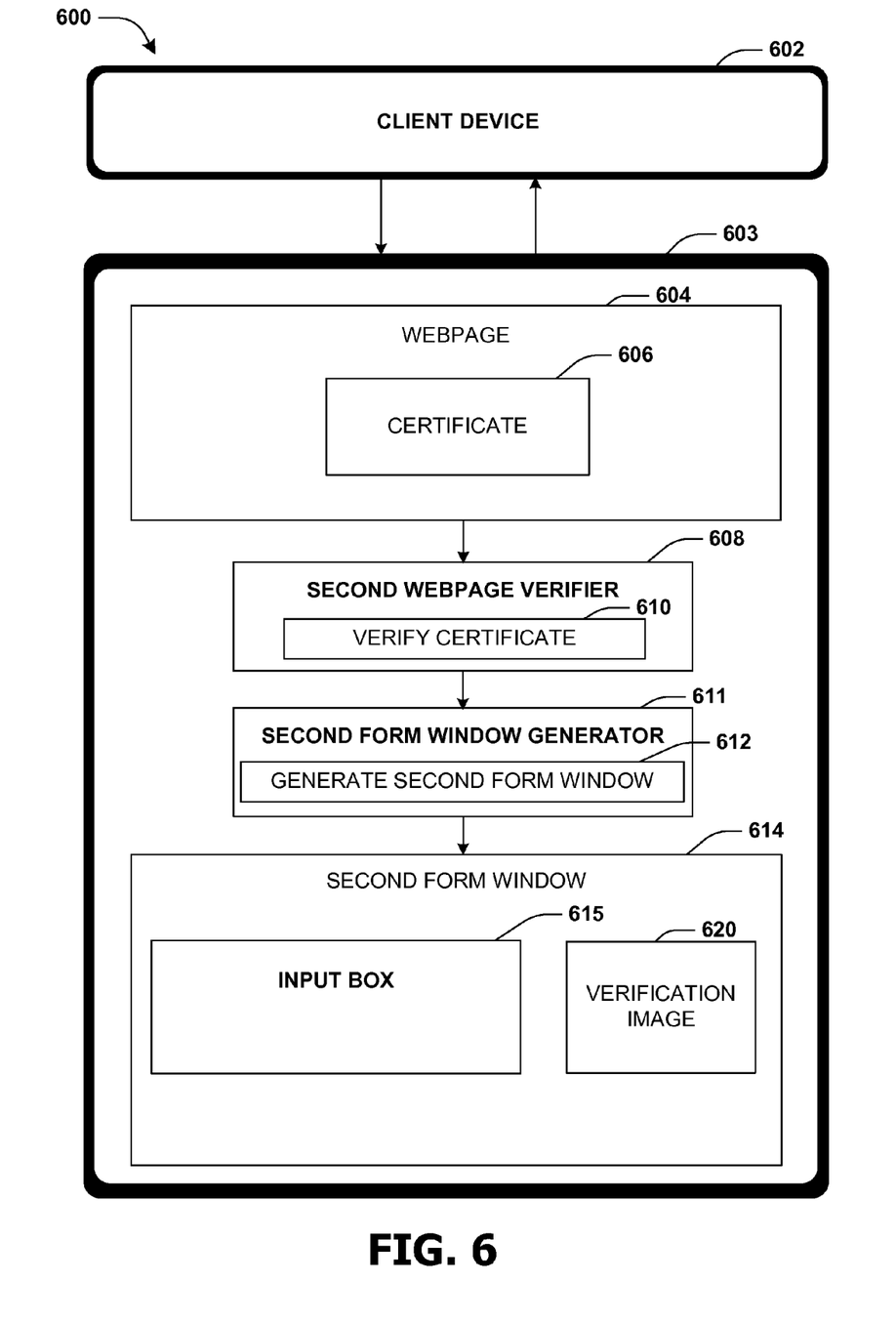
FIG. 6 is a component block diagram illustrating an example system for accessing a user account provided by a server, where a second form window comprising a verification image is generated.

FIG. 6 illustrates an example system 600 for accessing a user account, provided by a server, utilizing a client device 602 and a second client device 603. The client device 602 may comprise a system comprising a browser, an operating system, an application interacting with one or more webpages, etc. A user, of the client device 602, may have locally stored a verification image 620 for a webpage 604 (e.g., a webmail login page of a webmail provider). The user of the client device 602 may use the second client device 603 (e.g., comprising a second processor, a second display, and/or a second memory storing instructions that, when executed on the second processor provide a second system). In an example, the second system of the second client device 603 may comprise the browser, a second browser, the operating system, a second operating system, the application, and/or a second application interacting with one or more webpages, etc. The second client device 603 may navigate to the webpage 604. Responsive to a second webpage verifier 608 verifying 610 that a certificate 606 associated with the webpage 604 is authentic, the client device 602 may instruct a second form window generator 611, of the second client device 603, to generate a second form window 614 to comprise the verification image 620 an input box 615, and/or a login box (not shown). The client device 602 may instruct the second form window generator 611 to present the second form window 614 to the user through the second client device 603. In an example, responsive to the client device 602 and the second client device 603 comprising the browser, the browser of the client device 602 may provide instructions (e.g., comprising an instruction to present the verification image 620 to the user, responsive to the second browser verifying the webpage 604) to the second browser of the second client device 603.

Figure 7A:
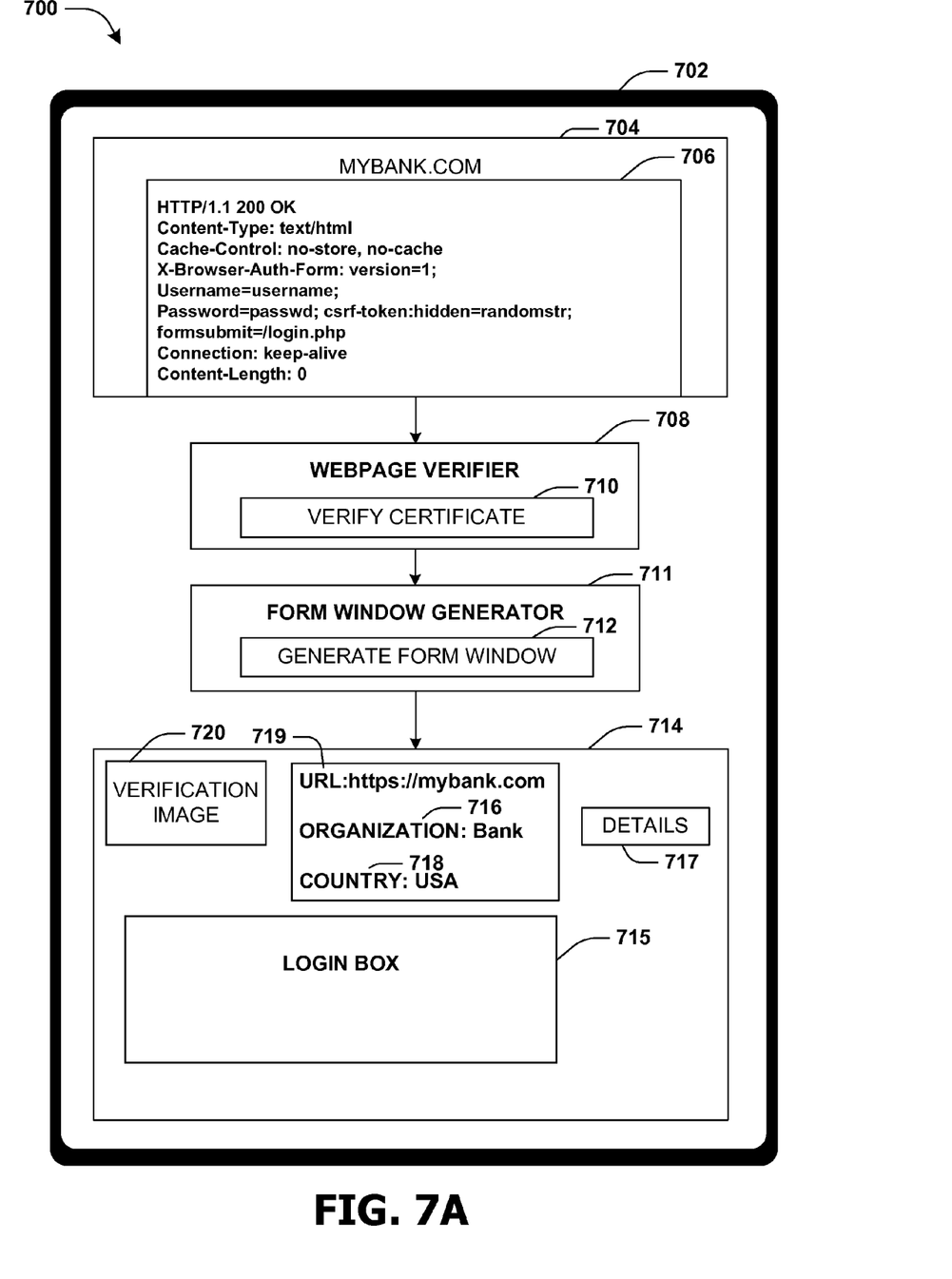
FIG. 7A is a component block diagram illustrating an example system for accessing a user account provided by a server, where an example form window comprising a verification image is generated.

FIGS. 7A-7B illustrate an example system 700 for accessing a user account, provided by a bank server 730, utilizing a client device 702. A user, of the client device 702 may navigate to MyBank.com 704 (e.g., a webpage used to log into a bank account). A certificate 706 may be associated with the MyBank.com 704 and provided to the client device 702 during a "handshake" (e.g., a SSL handshake, a TLS handshake, etc.) between the client device 702 and the bank server 730. A webpage verifier 708 may verify 710 that the certificate 706 is authentic (e.g., verify that the webpage 704 is associated with the bank server 730). Responsive to a request (e.g., an HTTP request) to MyBank.com 704 from the client device 702, the bank server 730 may provide a header (e.g., an HTTP header) to the client device 702. The header may comprise a special HTTP header embedded with one or more fields, such as user name information, password information, a formSubmit URL, etc. Additionally, the header may comprise caching information, content type information, etc. Responsive to the webpage verifier 708 verifying 710 the certificate 706, a form window generator 711 may generate 712 a form window 714. The form window 714 may be populated with a verification image 720, a login box 415, a URL 719 of the MyBank.com 704, an organization name 716 (e.g., Bank), a country 718 in which the bank resides (e.g., USA), and/or an option to view additional details 717. The login box 415 may comprise a username field, a password field, and/or an option to submit the form window 714. In another example, a browser toolbar and/or a URL box (e.g., such as in a secure form window) may be expanded and populated with a same or similar information as the form window 714 and/or the login box 415.

Figure 7B:
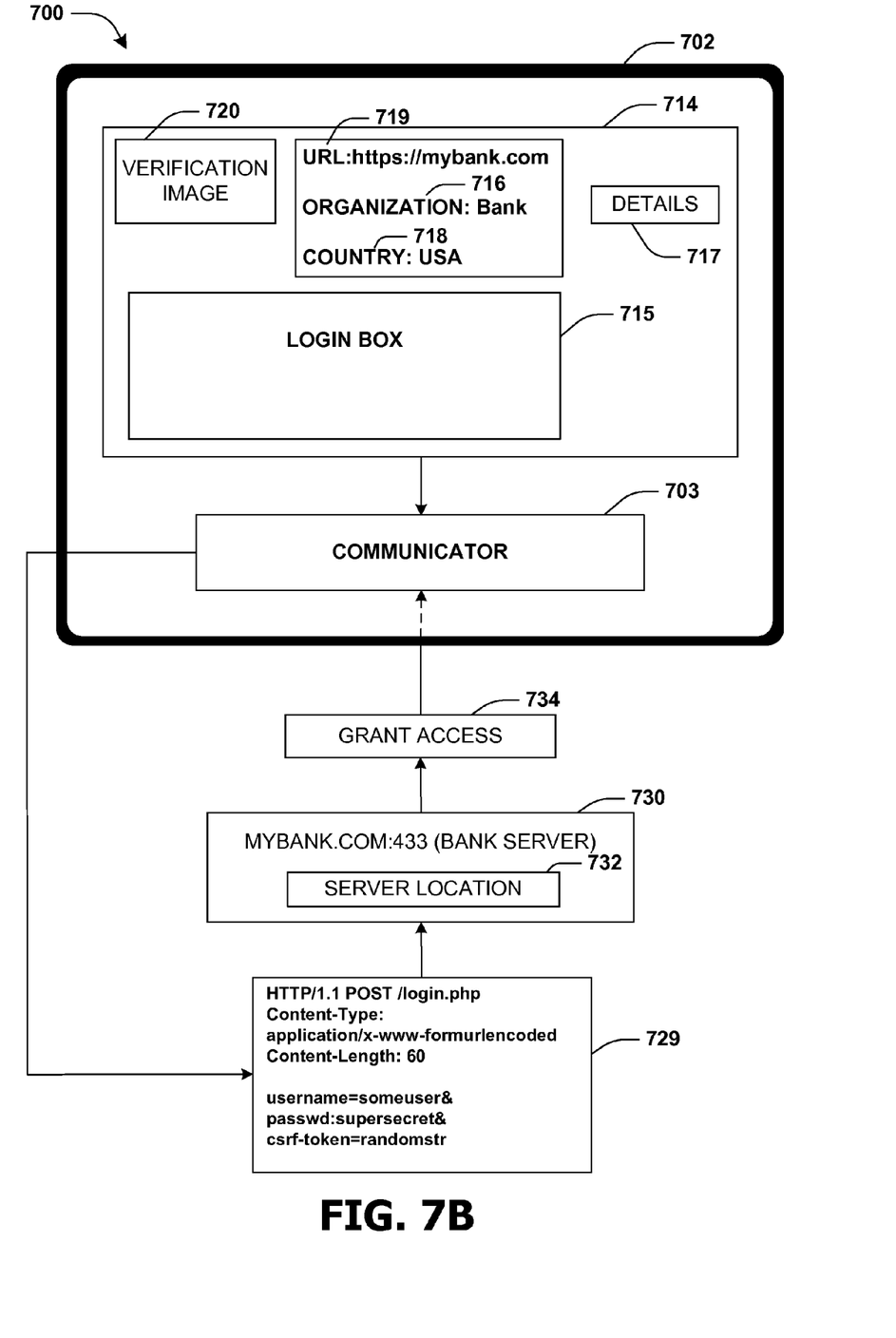
FIG. 7B is a component block diagram illustrating an example system for accessing a user account provided by a server, where an example form window is submitted and access to the user account is granted.

FIG. 7B illustrates the example system 700 granting access 734 to the user account of the user through the client device 702. Credentials (e.g., a username and/or a password) may be entered into the login box 715. The user may select the submit option, and a communicator 703 may submit the form window 714 (e.g., in a form submission format 729) to the bank server 730 at a server location 732 designated by the certificate 706. In an example, the server location 732 may be provided as an HTTP response header parameter. In an example, the form submission format 729 may comprise information about the username, information about the password, a cross-site request forgery (CSRF) token, etc. Responsive to the bank server 730 granting access based upon the credentials corresponding to the user account, the communicator 703 may present the user with a window (not shown) comprising access to the user account.

Figure 8:
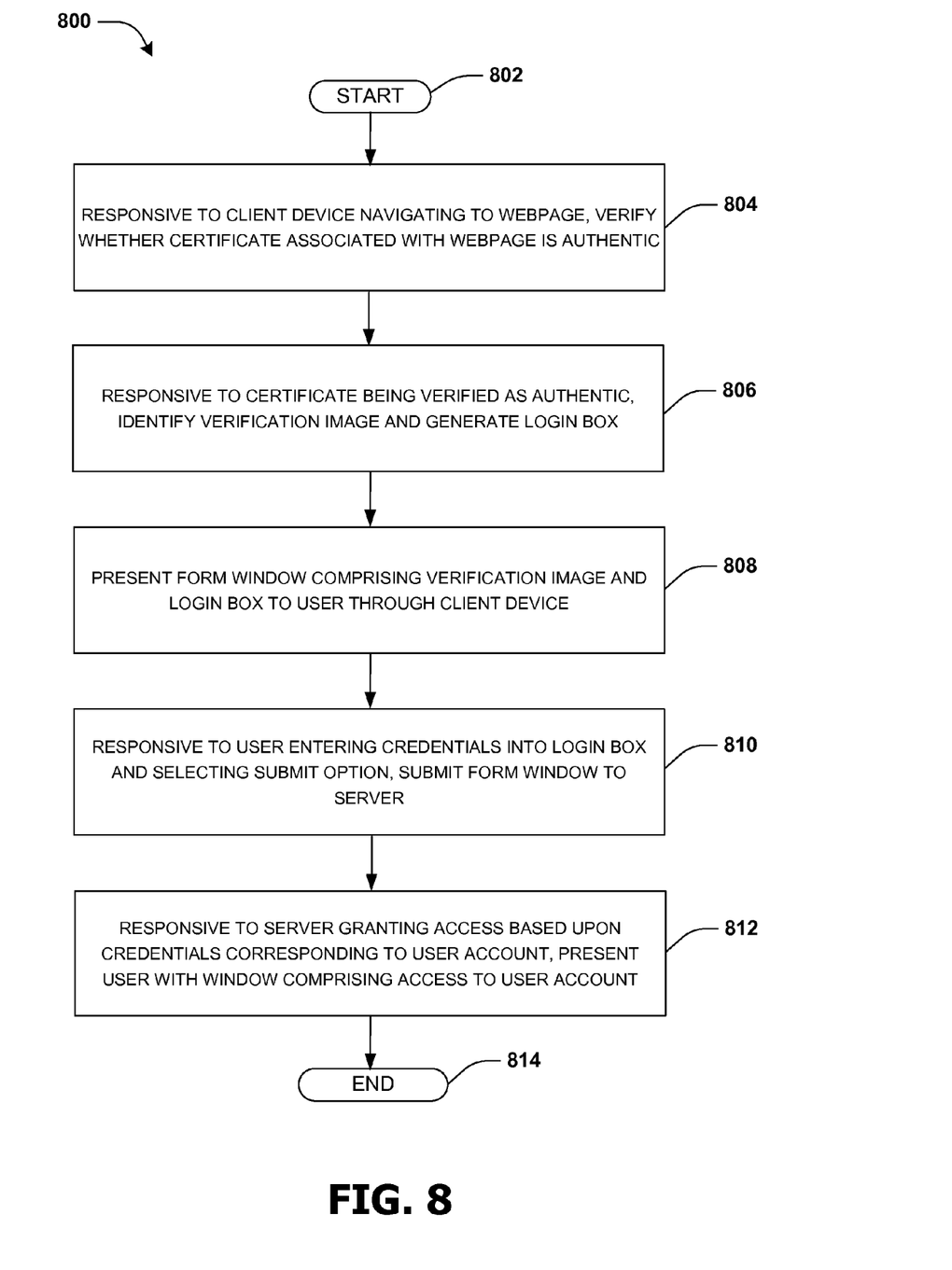
FIG. 8 is a flow chart illustrating an example method for accessing a user account provided by a server.

An embodiment of for accessing a user account provided by a server is illustrated by an example method 800 of FIG. 8. At 802, the method 800 starts. At 804, responsive to a client device, associated with a user, navigating to a webpage, a certificate associated with the webpage may be verified as authentic or not authentic. At 806, responsive to the client device verifying the certificate as authentic, a verification image (e.g., stored by the client device), may be identified and a login box to log into the user account, may be generated. The verification image may have an association with the server (e.g., the verification image may be identified based upon a server address of the server). For example, the verification image may be displayed for merely the webpage, and a different verification image may be displayed to verify a different webpage. At 808, a form window, comprising the login box, the verification image, and/or a server verification image may be presented to the user through the client device. At 810, responsive to the user entering credentials into the login box and selecting a submit option based upon recognition of the verification image, the form window may be submitted to the server at a server location designated by the certificate. At 812, responsive to the server granting access based upon the credentials corresponding to the user account, the user may be presented with a window comprising access to the user account. At 814, the method 800 ends.

Figure 9:
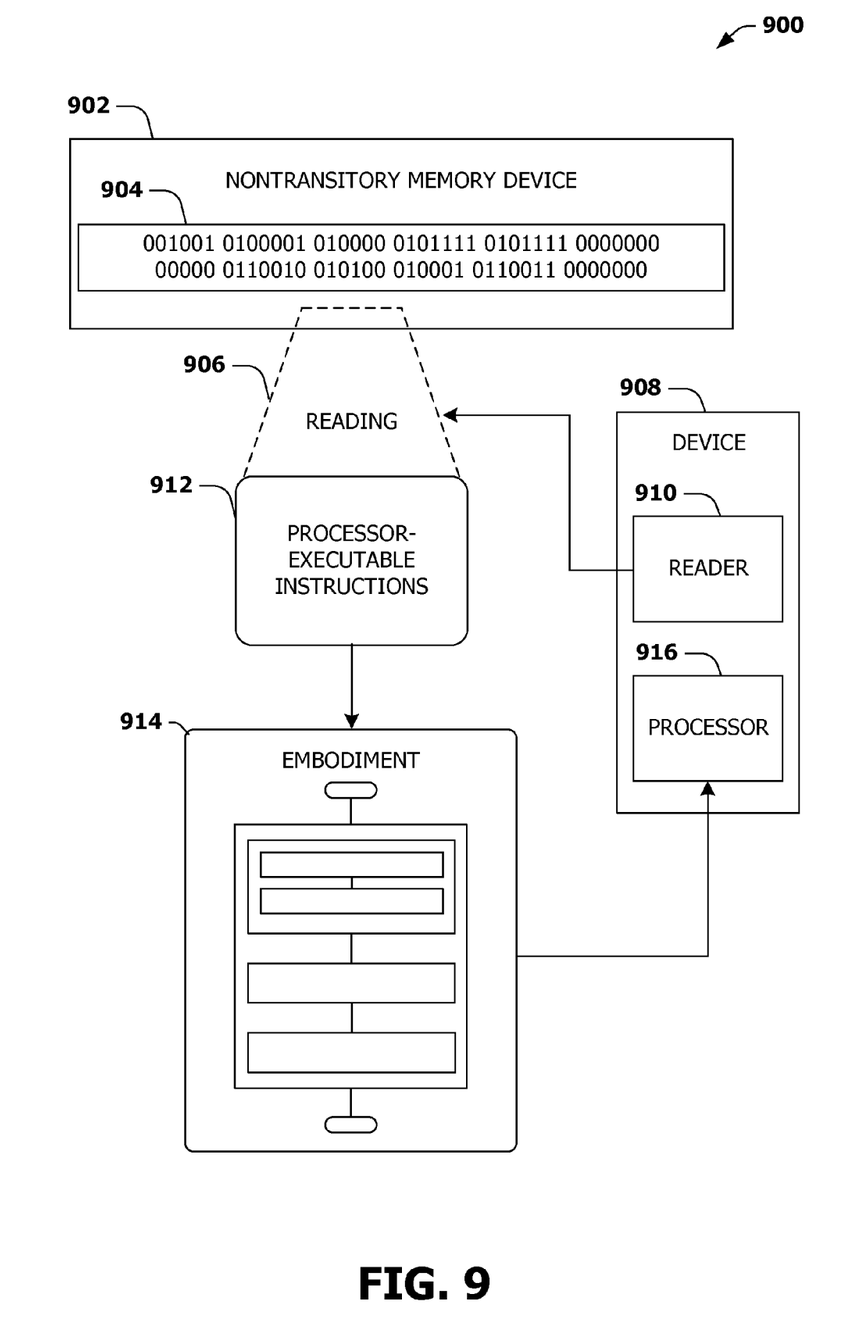
FIG. 9 is an illustration of a scenario featuring an example nontransitory memory device in accordance with one or more of the provisions set forth herein.

FIG. 9 is an illustration of a scenario 900 involving an example nontransitory memory device 902. The nontransitory memory device 902 may comprise instructions that when executed perform at least some of the provisions herein. The nontransitory memory device may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 902 stores computer-readable data 904 that, when subjected to reading 906 by a reader 910 of a device 908 (e.g., a read head of a hard disk drive, or a read operation invoked on a solid-state storage device), express processor-executable instructions 912. In some embodiments, the processor-executable instructions, when executed on a processor 916 of the device 908, are configured to perform a method, such as at least some of the example method 800 of FIG. 8, for example. In some embodiments, the processor-executable instructions, when executed on the processor 916 of the device 908, are configured to implement a system, such as at least some of the example system 400 of FIGS. 4A-4B, at least some of the example system 500 of FIG. 5, at least some of the example system 600 of FIG. 6, and/or at least some of the example system 700 of FIGS. 7A-7B, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A client device for accessing a user account provided by a server, the client device comprising:
    a processor;
    a display; and
    a memory storing instructions that, when executed on the processor, provide a system comprising:
        a communicator to:
            provide a request associated with a webpage to the server; and
            in response to the request, receive, from the server, a header embedded with a field for username information, a field for password information, a field for a formSubmit URL, caching information and content type information;
        a webpage verifier to verify whether a certificate associated with the webpage is authentic;
        a form window generator to:
            identify a verification image stored by the client device having an association with the server providing the webpage;

generate, using the header, a form window populated with the verification image based upon the webpage being verified as authentic; and present the form window and a login box, to log into the user account, to the user; and responsive to correct credentials being entered into the login box and the user selecting a submit option based upon recognition of the verification image, the communicator to:

submit the form window to the server at a server location designated by the certificate; and present the user with a window comprising access to the user account.

2. The client device of claim 1, the system configured to: responsive to the user of the client device navigating to the webpage for an initial visit, request the user select an image to comprise the verification image.

3. The client device of claim 1, the system configured to: responsive to the user of the client device navigating to the webpage, identify an image from the certificate to comprise a server verification image selected by the server.

4. The client device of claim 3, the system configured to: generate the form window populated with the verification image and the server verification image based upon the webpage being verified as authentic.

5. The client device of claim 1, the certificate comprising at least one of:

a secure socket layer, a transport layer security, or an extended validation certificate.

6. The client device of claim 1, the form window generator configured to:

generate the form window to comprise at least one of a name of an organization providing the webpage, a country in which the organization resides, a province in which the organization resides, an address at which the organization resides, or a domain name associated with the webpage.

7. The client device of claim 1, the system comprising at least one of an operating system, a browser, or an application that communicates with one or more webpages.

8. The client device of claim 7, the system configured to instruct a second client device comprising at least one of the operating system, a second operating system, the browser, a second browser, the application, or a second application that communicates with one or more webpages.

9. The client device of claim 8, the system configured to: responsive to the second client device, associated with the user, navigating to the webpage and verifying that the certificate associated with the webpage is authentic, instruct the second client device to generate a second form window comprising the verification image; and instruct the second client device to present the second form window to the user through the second client device.

10. The client device of claim 1, comprising:
the form window generator configured to:
hide a username field of the login box from the user; and
hide a password field of the login box from the user; and
a cache component configured to:
enter the username from a cache into the username field; and
enter the password from the cache into the password field.

11. A method for accessing a user account provided by a server, comprising:

responsive to a client device, associated with a user, navigating to a webpage:

receiving, from the server, a header embedded with a field for username information, a field for password information, a field for a formSubmit URL, caching information and content type information;

verifying whether a certificate associated with the webpage is authentic;

responsive to the client device verifying the certificate as authentic:

identifying a verification image stored by the client device having an association with the server providing the webpage; and generating a login box, using the header, to log into the user account;

presenting a form window comprising the verification image, based upon the webpage being verified as authentic, and the login box to the user through the client device;

responsive to the user entering credentials into the login box and selecting a submit option based upon recognition of the verification image, submitting the form window to the server at a server location designated by the certificate; and responsive to the server granting access based upon the credentials corresponding to the user account, presenting the user with a window comprising access to the user account.

12. The method of claim 11, comprising:
responsive to the client device verifying the certificate as authentic and identifying an image comprised in the certificate, presenting the image from the certificate, to comprise a server verification image, to the user on the client device; and responsive to the user selecting the submit option based upon recognition of the server verification image, submitting the form window to the server.

13. The method of claim 11, comprising:
responsive to the user of the client device navigating to the webpage, identifying an image from the certificate to comprise a server verification image.

14. The method of claim 13, comprising:
generating the form window populated with the verification image and the server verification image based upon the webpage being verified as authentic.

15. The method of claim 11, comprising utilizing a mobile application on the client device to navigate to the webpage.

16. The method of claim 11, comprising:
generating the form window to comprise at least one of a name of an organization providing the webpage, a country in which the organization resides, a province in which the organization resides, an address at which the organization resides, or a domain name associated with the webpage.

17. The method of claim 11, comprising:
responsive to a second client device, associated with the user, navigating to the webpage and verifying the certificate associated with the webpage is authentic, providing the second client device with the verification image; and instructing the second client device to generate a second form window comprising the verification image.

18. A client device for accessing a user account provided by a server, the client device comprising:
a processor;

a display; and a memory storing instructions that, when executed on the processor, provide a system comprising:

a communicator to:

provide a request associated with a webpage to the server; and in response to the request, receive, from the server, a header embedded with a field for username information, a field for password information, a field for a formSubmit URL, caching information and content type information;

a webpage verifier to verify whether a certificate associated with the webpage is authentic;

a form window generator to:

responsive to the webpage being verified as authentic:

identify a verification image stored by the client device having an association with the server providing the webpage;

generate, using the header, a form window populated with the verification image; and present the form window and an input box to the user; and responsive to the user entering correct input into the input box and selecting a submit option, based upon recognition of the verification image, the communicator to:

submit the form window to the server at a server location designated by the certificate; and present the user with a window comprising a confirmation of receipt of the input.

19. The client device of claim 18, the system configured to at least one of:

request that the user select an image to comprise the verification image.

20. The client device of claim 18, the system, comprising a browser, configured to:

instruct a second client device, comprising the browser, to generate a second form window comprising the verification image based upon the second client device, associated with the user, navigating to the webpage and verifying the certificate associated with the webpage is authentic; and instruct the second webpage verification component to present the second form window to the user through the second client device.

* * * * *